United States Patent [19]

Frechette

[11] 4,019,396
[45] Apr. 26, 1977

[54] POWERED WHEEL SYSTEM
[76] Inventor: Alphonse A. Frechette, 8 Cypress St., Salem, Mass. 01970
[22] Filed: Mar. 23, 1976
[21] Appl. No.: 669,633

Related U.S. Application Data
[63] Continuation-in-part of Ser. No. 593,723, July 7, 1975, abandoned.
[52] U.S. Cl. .................................. 74/63; 74/64; 74/572; 185/27
[51] Int. Cl.² ..................................... F16H 21/12
[58] Field of Search ............... 74/63, 64, 87, 572; 185/4, 6, 27, 28, 32; 60/325, 327, 413, 326, 721

[56] References Cited
UNITED STATES PATENTS

| | | | |
|---|---|---|---|
| 1,578,223 | 3/1926 | Waclaw | 74/64 |
| 1,688,785 | 10/1928 | Chalmers | 74/64 |

FOREIGN PATENTS OR APPLICATIONS

| | | | |
|---|---|---|---|
| 862,474 | 3/1961 | United Kingdom | 185/27 |

Primary Examiner—Edgar W. Geoghegan
Attorney, Agent, or Firm—Thomas C. Stover, Jr.

[57] ABSTRACT

A powered wheel system wherein a rapidly rotating wheel carries weighted balls upwardly to load the downward side of a slower rotating power wheel to drive the same. The balls are unloaded at the bottom of the power wheel and then picked up by the rapidly rotating wheel and the cycle repeated.

In another embodiment, the rapidly rotating wheel is driven by a connected drive-wheel, which carries a plurality of ball weights in an eccentric loop, inwardly on the upward side and outwardly in the downward side of such drivewheel as it rotates.

The power wheel drives a flywheel which has reciprocably moveable weights mounted thereon, a plate with an eccentric guide path is provided which directs the weights inwardly on the upward side of the wheel and outwardly on the downward side of the wheel as the wheel rotates.

15 Claims, 9 Drawing Figures

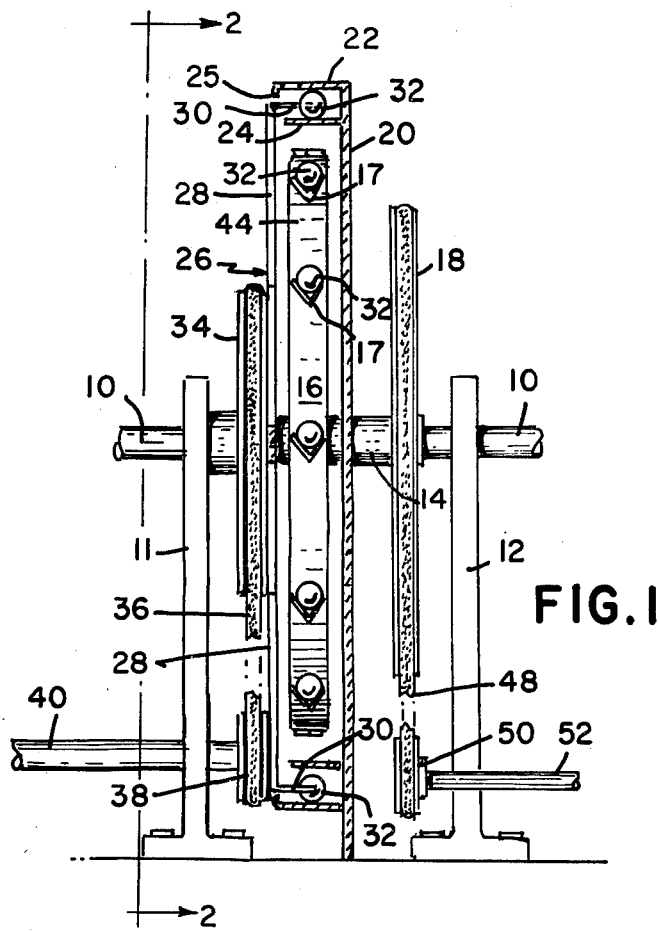
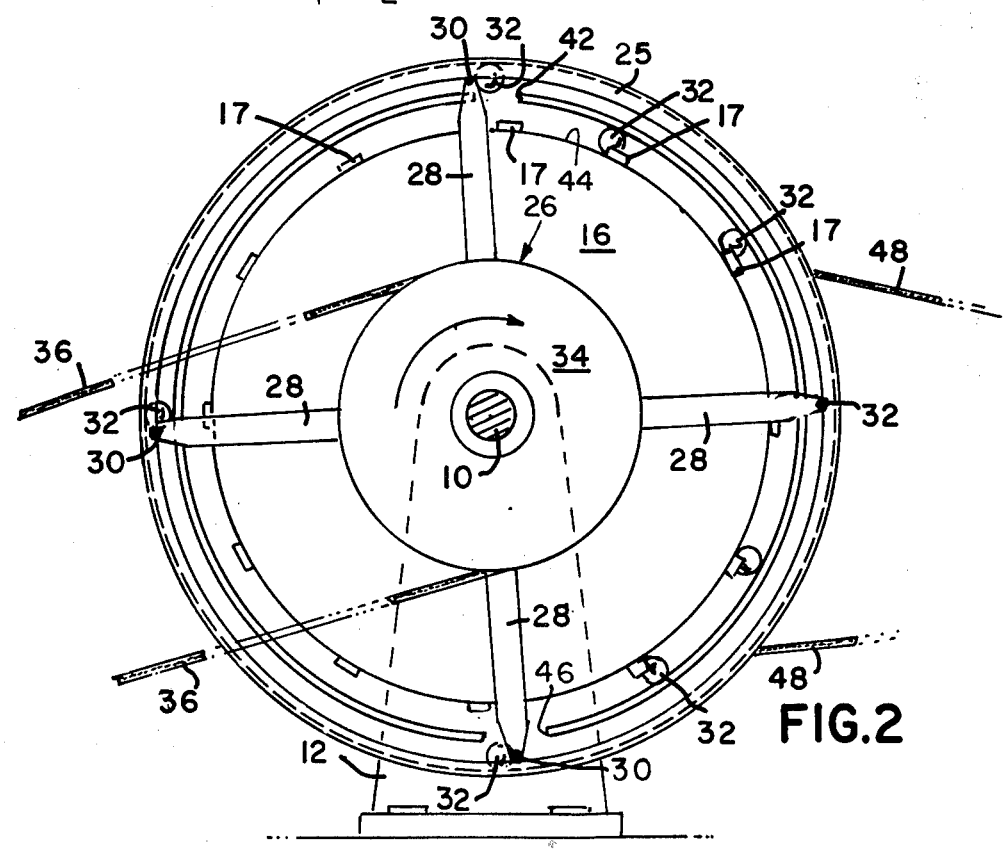

POWERED WHEEL SYSTEM

The following is a continuation-in-part of applicant's co-pending applicaiton, Ser. No. 593,723, filed July 7, 1975, now abandoned.

FIELD OF THE INVENTION

This invention relates to a powered wheel system particularly a system for rotating at least one wheel employing weight transference.

THE PRIOR ART

Although rotational power transformance systems are known and in use eg. a large gear or pulley axially connected with a smaller gear or pulley to obtain a linear velocity step-down and a power (or torque) step-up, the same angular velocity between rotational pulleys or gears results and one has not obtained rotational power transformance from rotational bodies such as pulleys or gears of approximately by same diameter. There is a need and market for such rotational powered transformance between rotational bodies of approximately the same size for greatly increased torque step-up or linear velocity decrease or increase.

SUMMARY

There has now been discovered a method for transferring and transforming rotational power between rotational bodies of approximately the same size at a trade-off of increase or decrease of the relative angular velocity between such rotational bodies.

The present invention provides such a means for transference of rotational power between various sized power sources which comprises a powered wheel system comprising a rotatable substantially vertically mounted wheel; a plurality of weight holders spaced around said wheel proximate the periphery thereof; a plurality of weights for said system; means for loading said weights into said holders on the downward side of said wheel at least proximate the top portion thereof to rotate said wheel; means for unloading said weights from said holders at least proximate the bottom portion of said wheel and lifting means for transporting the so-unloaded weight back to the top portion of said wheel for reloading into said holders such that said wheel is driven by the so-applied weights.

The present invention further provides an unbalanced flywheel comprising a rotatable substantially vertically mounted wheel; a plurality of weights positioned around the axis of said wheel and reciprocally moveable inwardly and outwardly thereon with respect to said axis; means for rotating said wheel and means for directing said weights inwardly on the upward side of said wheel and outwardly on the downward side of said wheel as it rotates.

DESCRIPTION

The invention will become more apparent from the following detailed specification and drawing in which:

FIG. 1 is an end sectional elevation view of the apparatus embodying the powered wheel system of the invention;

FIG. 2 is a front side sectional elevation view of components of the apparatus of FIG. 1 taken on lines 2—2, looking in the direction of the arrows;

Figure 3:
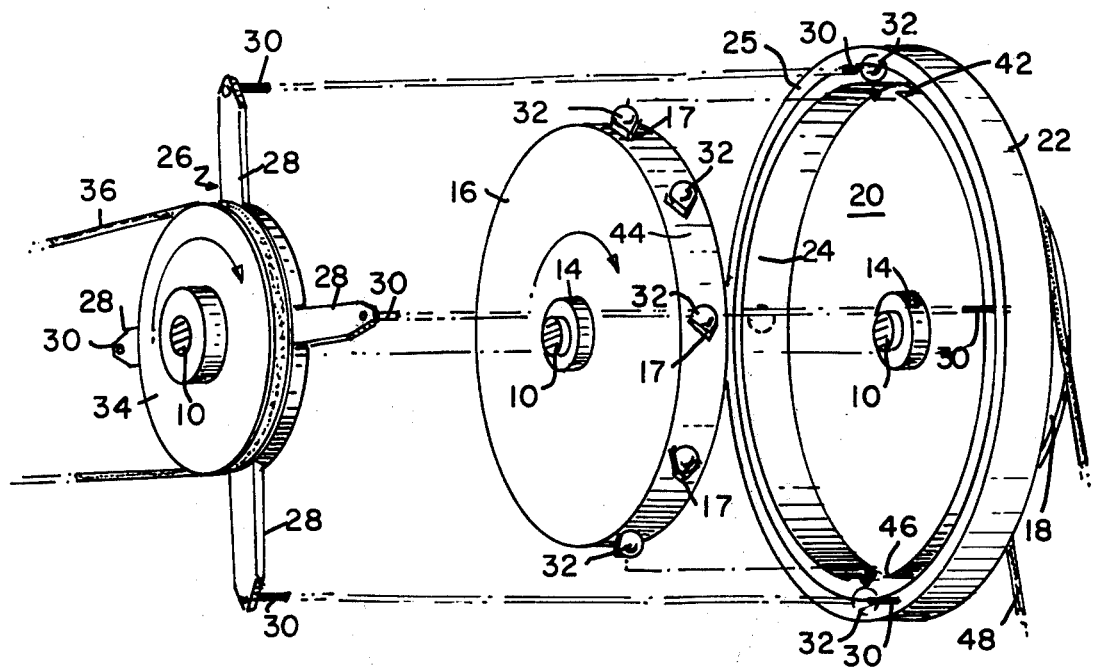
FIG. 3 is an isometric projection of components of the apparatus embodying the invention shown in FIGS. 1 and 2.

Referring now to the drawings, shaft 10 passing through support blocks 11 and 12 passes through and supports hollow coaxial shaft 14, which rotates independently thereof and which is affixed to load carrying wheel 16 and power takeoff wheel or gear 18, as shown in FIG. 1. Power wheel 16 which has weight holders 17 mounted thereon, is mounted in spaced relationship to guide panel 20, which supports flanges 22 and 24, which define a concentric channel 25 around the periphery of the power wheel 16, as shown in FIGS. 1, 2 and 3.

On the opposite side of the power wheel 16, mounted on shaft 10, to rotate independently thereof is pinwheel 26 which extends to the concentric channel 25, each of the arms 28 of the pinwheel 26 terminating in a weight lifting finger 30 which sweeps such concentric channel as the pinwheel 26 rotates, as shown in FIGS. 1, 2 and 3. The weighted balls 32 are accordingly lifted in the concentric channel 25 by the pinwheel fingers 30 to the upper portion of the power wheel 16 to load the same as hereinafter described.

The pinwheel 26 is attached to pulley 34, which is driven by belt 36, as shown in FIGS. 1, 2 and 3, which belt 36 is driven in turn, by lower pulley 38, shown in FIG. 1.

Lower pulley 38 is rotated by drive shaft 40, which can be driven by any suitable power means and which can also be driven by the buoyant gravity powered apparatus disclosed in my copending U.S. patent application Ser. No. 584,380, filed June 6, 1975.

In operation, the pinwheel 26 is rotated considerably faster than the power wheel 16 so that weighted balls 32 are rapidly conveyed by the pinwheel 26, also known herein as the lifting means, rapidly up the channel 25 until they reach the upper portion thereof where they drop through a slot 42 in the lower channel flange 24 onto the periphery 44 of the power wheel 16 and into the nearest weight holder 17 below to add rotational force to the power wheel 16 on its downward side, as shown in FIGS. 2 and 3. The weighted balls 32 rotate the power wheel 16 and descend to the bottom thereof where they roll off their respective holders 17 and down through the lower slot 46 in the flange 24, into the channel 25, to be swept again upwardly by the next approaching finger 30 to the top of the channel 25 to reload the power wheel 16 and the cycle is repeated, as shown in FIGS. 2 and 3.

The power wheel 16, which turns on hollow axle 14 in common with the power take-off wheel 18, rotates more powerfully and more slowly than the pinwheel 26, which, as indicated in FIGS. 2 and 3, must make a 90° rotation for every lesser degree rotation (eg. 7") between weight holders of the power wheel 16, to keep the latter wheel fully loaded on its downward side.

The power take-off wheel 18, of power wheel 16, is connected by endless belt 48 to power receptor means, eg. a pulley 50 connected by a shaft 52 to eg. a generator or a flywheel including an unbalanced flywheel embodying the invention as described herein.

Figure 4:
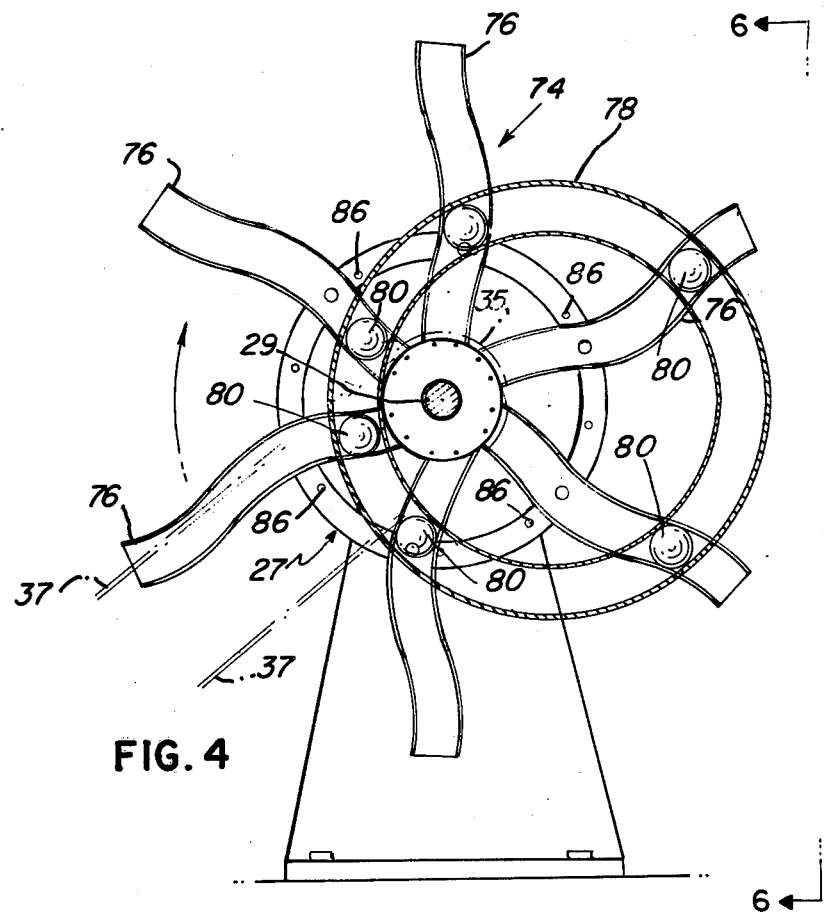
FIG. 4 is a front side elevation view of another apparatus embodying the powered wheel system of the invention.
Figure 5:
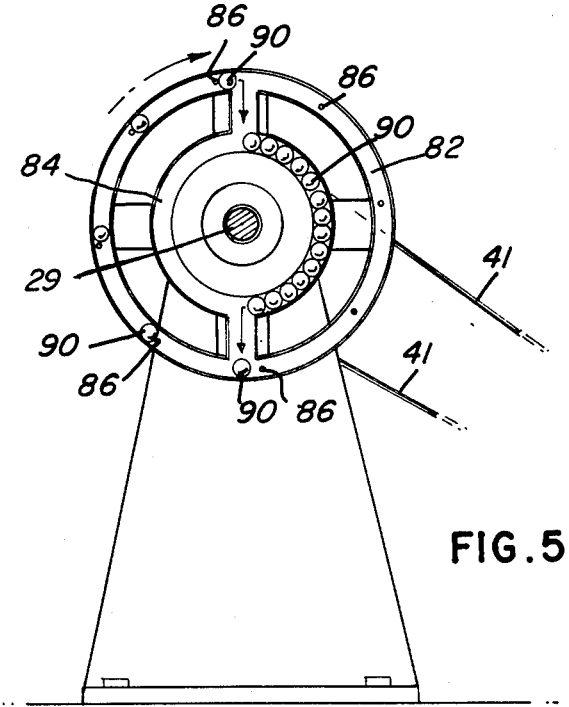
FIG. 5 is a rear side elevation view of the apparatus embodiment shown in FIG. 4.
Figure 6:
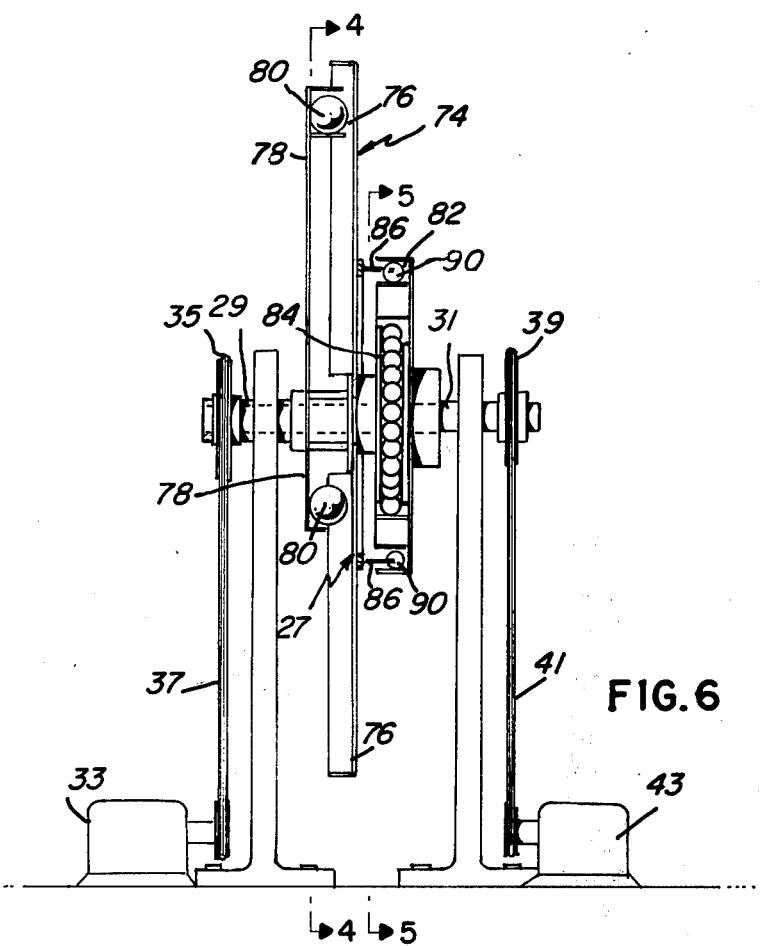
FIG. 6 is an end sectional elevation view of the apparatus embodiment of FIG. 4, taken on lines 6—6, looking in the direction of the arrows.
Figure 7:
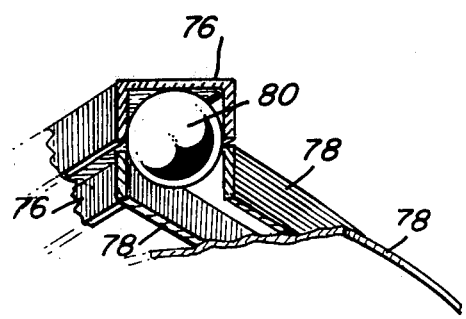
FIG. 7 is an isometric projection of portions of components of the apparatus of FIG. 4.

In another embodiment of the invention, attached to the reverse side of the pinwheel 27 is serpentine booster pinwheel 74 having curved arms 76, as shown in FIGS. 4, 5 and 6.

The arms 76 are closely spaced from elliptical guide 78 so as to support therebetween weighted balls 80, as shown in FIGS. 4 and 5.

The arms 76, upon being rotated, push and roll the balls 80 around the closed loop defined by the guide 78, as shown in FIG. 4. The arms 76 are curved, as shown in FIG. 4 to minimize friction as the balls 80 are driven around the elliptical path of guide 78.

Attached on the reverse side of the pinwheel 74 is weight lifting pinwheel 27, having a plurality of weight lifting fingers 86, which sweep such channel as the pinwheel 27 rotates, as shown in FIG. 5. The weighted balls 90 are thus lifted clockwise in the channel 82 to load the upper portion of the power wheel 84, shown in FIG. 5, in the manner previously described to drive such power wheel.

Little effort is required to rotate the pinwheel 74 (and the attached pinwheel 27), FIGS. 4 and 6, since the weighted balls 80 are directed by the guide 78 close to the pinwheel (74) center on the upsweep of the arms 76 and relatively far from said center on said arms on 76 the downsweep, where considerable downward leverage is applied to said arms 76 for near effortless rotation of the pinwheel 74.

The pinwheel 74 and the pulley 35 are rotatably coaxially mounted on the shaft 29, as shown in FIGS. 4 and 6. Power input means, eg. motor 33, is connected by belt 37 to the pulley 35, to drive it and the pinwheel 74 and thus the associated pinwheel 27, as shown in FIG. 6. The power wheel 84 and the pulley 39 are rotatably mounted on the shaft 31 to drive the belt 41 and power take-off means eg. generator 43 as shown in FIG. 6.

Figure 8:
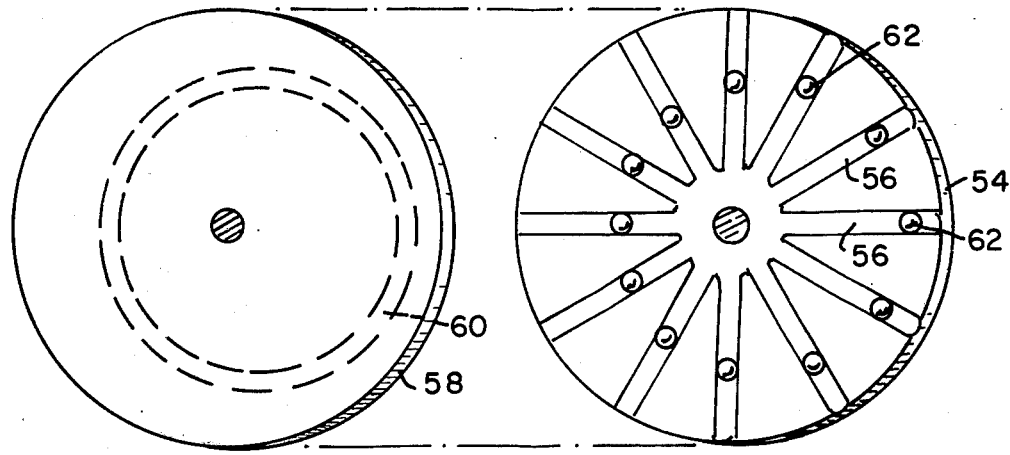
FIG. 8 is an elevational view of components of another apparatus embodying the present invention and FIG. 9 is an end elevational view of the components of FIG. 8 assembled to show a flywheel apparatus embodying the present invention.
Figure 9:
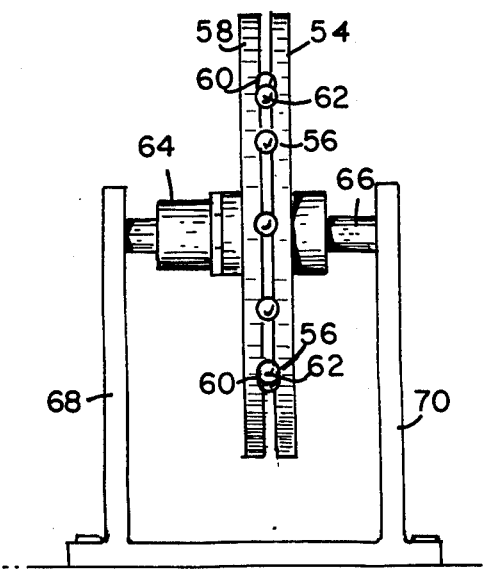

To assist in maximum power output from the power wheel embodying the invention, a flywheel can be connected thereto, as described above, including the unbalanced flywheel embodying the present invention. Thus flywheel 54, having radial grooves 56, is closely spaced from guide plate 58, having annular groove therein 60 as shown in FIGS. 8 and 9. The flywheel 54 and guide plate 58 are mounted face-to-face as shown in FIG. 9, in close spaced proximity, so as to support therebetween weighted balls 62, which rest simultaneously in the radial grooves 56 and the annular grooves 60, as shown in FIGS. 8 and 9. The annular groove 60 of guide plate 58 is shown in phantom superimposed on the radial grooves 56 of the flywheel 54 in FIG. 8.

The guide plate 58 is fixedly mounted on stationary hollow axle 64 and the flywheel 54 is rotatably mounted on inner concentric axle 66. The flywheel and plate are spaced such that the weighted balls 62 are confined within the respective radial annular grooves thereof and are free to roll within the confines of such grooves. The respective axles 64 and 66 are supported by upright members 68 and 70, as shown in FIG. 9.

In operation the flywheel 54 is rotated either by means not shown including conventional means or by power wheel 16 shown in FIGS. 1, 2 and 3 such that the weighted balls 62 are directed inwardly and outwardly along their respective radial grooves 56 of the flywheel 54 and at the same time along the annular groove 60 of the guide plate 58. In this manner the weighted balls travel an annular or eccentric path on the flywheel that is close to the axis thereof on the upward side of the rotational cycle and farther from the axis and nearer the periphery of such flywheel on the downward side of the rotational cycle, as indicated in FIG. 8. In this manner, as in the operation of pinwheel 74 and elliptical guide 78, greater leverage is applied to the flywheel utilizing gravity and leverage principles to maximize the power output derived therefrom.

Thus the embodiments of the present invention provide for a step-up from a faster light-power wheel, pinwheel 26 to a slower heavy-power wheel 16 for high work load performing capability and such work output is assisted by the connecting thereto of an unbalanced flywheel which has increased gravity leverage on the downward side thereof.

By the downward side (or downsweep) side of the power wheel embodying the invention is meant the upper portion of the wheel where the slope is either horizontal or substantially so or downwardly. By upward (or upsweep) side of such power wheel embodying the present invention is meant the bottom portion thereof where the slope is level or nearly so, as well as where the slope is upwardly. It will be recognized within the scope of the present invention that the weights can be loaded on the power wheel just prior to its reaching its crest, at the crest or below the crest to have a workable embodiment. However, it is preferable that such weights are deposited on the power wheel of the invention at or beyond the crest on the down side thereof. Similarly, such weights can be unloaded at or near the wheel bottom.

The respective components of the power wheel embodying the present invention including pinwheel, power wheel, plates, radial channels, pinwheel guide channels, pulleys, gears, channels and the like can be constructed of wood, plastic, metal including aluminum and steel and preferably are constructed of stainless steel.

The term "wheels" as employed herein, includes pulleys and gears as well as wheels.

The weights employed in the power wheel apparatus embodying the invention can take various shapes including oval, cylindrical, rounded, angular or a combination thereof. If the weights are angular and not readily rollable the lifting means will have to be constructed accordingly.

The weights, which are preferably rounded and preferably in the form of balls for ease of transport or other shaped weights, can be constructed of wood, plastic, metal, solid or liquid filled and preferably are constructed of metal, due to the added weight and greater durability thereof. Solid stainless steel balls are preferred weights.

The weight holders on the power wheel of the invention can be of various shapes so as to hold one or more such weights as the wheel descends therewith and can include hooks or magnets where desired.

The lifting means of the present invention, which lifts the weights from the bottom of the power wheel to the top thereof can be in various forms including rotatable bodies, webs, belts or other suitable means. For example, the lifting means can be an endless belt with compartments which receive the weights released from the power wheel and which convey the same without the need of a channel back to the top of the power wheel where a gate or magnet release or other means then deposits the weight onto such power wheel. The lifting means of the invention further can lift one or more such weights at a time to the top of the power wheel. Preferably, however, a rotatable lifting means lifts each weight in sequence to the upper portion or top of the power wheel.

The pinwheel embodiment of the lifting means of the invention, eg. pinwheel 26, can have one, two, three, four or more arms with associated weight lifting means attached thereto as desired. Four such arms have been found sufficient within the scope of the present invention but more such arms may be employed if desired.

The arms 76 of the pinwheel 74 are a plurality and preferably at least 4. Their arms can be curved, straight or a combination thereof and preferably are curved as illustrated in FIG. 4 to minimize friction.

The guide, eg. guide 78 of FIG. 4, can take various shapes including elliptical, oval, round and other shapes, provided such guide axis is mounted off-center with respect to the pinwheel axis. Accordingly, the guide is mounted so that the upsweep side thereof is placed close to the pinwheel axis and the downsweep side is located relatively remote from such axis, eg. as shown in FIG. 4.

It is desirable to have the lifting means, eg. the pinwheel embodying the present invention rotating faster than the power wheel of the invention to keep the latter loaded with weights. However, it is not essential to maintain all the weight holders of the power wheel filled for the workability thereof. For example, the weight holders can be partially filled by a relatively slow rotating pinwheel and/or such pinwheel may convey several weights to the top of the power wheel periodically.

The means of transmitting work from the power wheel embodying the present invention, can be from a power take-off wheel, as discussed above, from the power wheel shaft, from the periphery of the power wheel or other take-off point, mode or means within the scope of the present invention.

The flywheel of the present invention rotates at any desired RPM including up to 7 to 2,000 RPM or more as desired. The flywheel is solidly mounted to minimize potential vibration tendencies.

By the "downward side" of the unbalanced flywheel embodying the present invention is meant the upper portion of the wheel where the slope is either horizontal or substantially so or downwardly in the direction of rotation. By "upward side" of such flywheel is meant the bottom portion thereof where the slope is level or nearly so as well as where the slope is upwardly in the direction of rotation.

In the operation of such flywheel the weights should be directed inwardly on the upward side of the wheel, that is at the bottom thereof or on the ascending part of the annular path of such weights and such paths should be directed outwardly from the axis of the wheel at, just prior to or after the path slopes downwardly. The annular path can take various shapes within the scope of the present invention. Smooth gradual turns of such annular path will, of course, meet less friction and resistance than abrupt turns of such path. Of course the radial and annular grooves respectively of the flywheel assembly should be well lubricated with a suitable medium, eg. lubricating oil.

The components of the flywheel of the present invention, including wheel and guide plate, can be of metal, wood, plastic and preferably are of metal for durability.

The weights employed in the flywheel of the invention are desirably round in at least one direction, the direction of rolling in the annular groove since they can reciprocate in the radial grooves, though of various lengthwise profiles. Such shapes can include oval, eliptical, oblong, cylindrical, cigar shaped and the like. Preferably, such weights are substantially spherical balls, for ease of travelling in the grooved system of the flywheel of the invention, which grooves are desirably lubricated with various oils or grease presently available.

The flywheel of the present invention can be connected with any power source presently available and can also be connected rotatably with the powered wheel disclosed in the present invention.

A plurality of the power wheel assemblies of FIGS. 4, 5 and 6 can be mounted around a common axis such that each power wheel drives a common shaft, with accumulative power output. The elliptical track 78 can be an elongated drum or cage serving all the booster pinwheels.

The following is intended as an example of the powered wheel system of the present invention and should not be construed in limitation thereof.

EXAMPLE I

In a powered wheel system, such as shown in FIGS. 4, 5 and 6, an eight arm serpentine pinwheel, each arm carrying a 5 inch diameter ball weighing 4/5 pounds was rotated at 24 rpm. The adjacent pinwheel having eight fingers lifted 24 balls per minute of 15/8 inches diameter and continuously loaded them onto a 38 inch diameter power wheel to drive it at 8 rpm. A load of 24 balls weighing about 19 lbs. was maintained on the power wheel.

Six such assembles shown in FIGS. 4, 5 and 6 were mounted such that six powerwheels drove a common shaft and a power output equivalent to about 2.5 H.P was obtained.

What is claimed is:

1. A powered wheel system comprising a rotatable substantially vertically mounted wheel, a plurality of weight holders spaced around said wheel proximate the periphery thereof; a plurality of weights for said system; means for loading said weights on said holders on the downward side of said wheel at least proximate the top portion thereof to rotate said wheel in a desired direction; means for unloading said weights from said holders at least proximate the bottom portion of said wheel and lifting means for transporting in the same direction the so-unloaded weights back to the top portion of said wheel for reloading onto said holders such that said wheel is driven by the so-applied weights.

2. The wheel system of claim 1 wherein said weights are balls.

3. The wheel system of claim 1 wherein said lifting means is an independently rotating member.

4. The wheel system of claim 3 wherein means are provided for rotating said lifting means at a faster angular velocity than said wheel to rapidly reload said weights.

5. The wheel system of claim 3 wherein said rotating member has finger extensions which travel in an annular path around said wheel, which fingers drive the unloaded weights in the form of balls from the lower to the upper portion of said wheel to reload said weights thereon.

6. The wheel system of claim 1 wherein said wheel is connected to a flywheel to drive the same.

7. An unbalanced flywheel comprising a rotatable substantially vertically mounted wheel, a plurality of weights positioned around the axis of said wheel and reciprocally moveable inwardly and outwardly thereon with respect to said axis; independant means for rotating said wheel and means for directing said weights inwardly on the upward side of said wheel and outwardly on the downward side of said wheel as it rotates.

8. The flywheel of claim 7 wherein said wheel has a plurality of inwardly tending grooves positioned around the axis thereof, a plurality of weights moveably positioned in said grooves and means for directing said weights in said grooves inwardly on the upward side of said wheel proximate the bottom portion thereof and outwardly on the downward side of said wheel proximate the top portion thereof as the wheel rotates.

9. The flywheel of claim 8 wherein said grooves are radially positioned around the axis of said wheel, said weights are balls and a guide plate, having an annular groove therein, is mounted face-to-face with said wheel such that the annular groove is inwardly to said axis on the upward side of said wheel and outwardly of said axis on the downward side of said wheel and said balls are positioned concurrently in the radial grooves and in said annular groove such that when said is rotated with respect to said guide plate, said balls travel back and forth in said radial grooves and also around said annular groove.

10. The flywheel of claim 9 connected to the wheel of claim 1.

11. The wheel system of claim 3 wherein the rotating lifting means is attached to a booster rotatable drive member.

12. The wheel system of claim 11 wherein said drive member has a plurality of channels radially directed toward the axis of said member, a plurality of weights positioned in said channels and reciprocally moveable therein with respect to said axis, means for rotating said wheel and means for directing said weights inwardly on the upward side of said member and outwardly on the downward side of said member as it rotates.

13. The wheel system of claim 12 wherein said weights are balls and a closed loop guide channel is mounted in close clearance with the radially directed channels to contain said balls, said guide channel being mounted axially off-center with respect to the axis of the drive member so that the guide channel is positioned inwardly of said axis on the upsweep side of said drive member and outwardly of said axis on the downsweep side of said drive member and said balls are positioned concurrently in the radially directed channels and in said guide channel such that when said drive member is rotated said balls travel back and forth in said radially directed channels and also around said guide channel inwardly of said axis on the upsweep and outwardly thereof on the downsweep of said drive member.

14. The wheel system of claim 13 wherein said drive member is a pinwheel having a plurality of radially directed channels.

15. The wheel system of claim 14 wherein said radially directed channels curve radially outward, forwardly then rearwardly relative to the direction of rotation of said drive member and said guide channel is elliptical in shape.

* * * * *